United States Patent [19]

Schultz et al.

[11] 4,373,182
[45] Feb. 8, 1983

[54] INDIRECT ADDRESS COMPUTATION CIRCUIT

[75] Inventors: Gary E. Schultz, San Juan Capistrano, Calif.; Albert J. Weidner, Tempe, Ariz.

[73] Assignee: Sperry Corporation, New York, N.Y.

[21] Appl. No.: 179,514

[22] Filed: Aug. 19, 1980

[51] Int. Cl.³ .............................................. G06F 9/36
[52] U.S. Cl. .................................................. 364/200
[58] Field of Search ... 364/200 MS File, 900 MS File, 364/737

[56] References Cited

U.S. PATENT DOCUMENTS

| | | | |
|---|---|---|---|
| 3,016,193 | 1/1962 | Brett | 364/737 |
| 3,497,630 | 2/1970 | Lucas | 364/900 |
| 3,949,378 | 4/1976 | Crabb | 364/200 |
| 3,969,704 | 7/1976 | Liebel | 364/900 |
| 4,016,546 | 4/1977 | Bennett | 364/200 |
| 4,054,945 | 10/1977 | Ichiko | 364/200 |
| 4,202,035 | 5/1980 | Lane | 364/200 |

*Primary Examiner*—Joseph F. Ruggiero
*Assistant Examiner*—Michael R. Fleming
*Attorney, Agent, or Firm*—G. Donald Weber, Jr.; Eugene T. Battjer

[57] ABSTRACT

This invention relates to a system for determining an effective address based upon a calculation performed on address information. Depending upon the result of the calculation firmware or hardware will control further operation of the system.

15 Claims, 3 Drawing Figures

INDIRECT ADDRESS COMPUTATION CIRCUIT

BACKGROUND

1. Field of the Invention

The invention relates to data processing systems, in general, and, more particularly, to microprogrammable processors, and memory addressing in such systems.

2. Description of the Prior Art

Microprogrammable processors are well-known in the prior art. Data flow in such processors is controlled by gating circuits which are enabled by selective control signals. The central processor operates by means of control signals which are formed from microprogram words.

A sequence of microprogram words (or a "microprogram") defines a sequence of "micro operations" which specify the data transfer paths in the system, therefore defining the overall internal operation of the processor. The exact sequence of microprogram words may, typically, be established by the address portion in each microprogram word. Likewise, the address portion in each microprogram word may be the address in the control store which contains the next microprogram word to be used in sequence. The central processor unit (CPU) control alters the addresses based upon various internal and external conditions.

The central processor unit responds to machine language instructions. Each machine language instruction has an operation code and may have an operand address. In order to execute the instruction, the central processor unit must perform a series of internal data transfers. For example, the contents of a register known as the program counter must be applied to the memory bus so that the next instruction can be fetched. The operation code of the instruction must be applied to an instruction decoder in order to be decoded. The operands, identified by the operand addresses, must be transferred to the central processor unit for processing.

There are basically two ways of controlling internal data transfers—either through hardware (digital circuits) or firmware (microprogramming). There are advantages for each of the two ways. That is, the hardware techniques are generally faster, while firmware is more flexible. Although many simple, controlled data transfers can be performed by either hardware or firmware, once one technique is selected in prior art data processing systems, it is generally not possible to perform that data transfer using a different technique without redesigning the computer architecture. Thus, many controlled data transfers are performed in a microprogrammable processor by firmware, even though it might have been desired to perform that particular data transfer by hardware. Such disadvantages of microprogrammable processors are overcome by the present invention.

Although microprogrammable processors are the most relevant field of prior art, various hardware related techniques of address calculation are found in non-microprogrammable processors, especially in microprocessors. Reference is made to U.S. Pat. No. 4,202,035 which describes a hardware apparatus for generating addresses for use in a microprocessor. The referenced patent describes the use of an adder for adding at least a portion of the digital values of the data contained in first and second registers so that the resulting digital value is within the range of addresses of the addressable memory. However, the referenced patent does not contemplate the use of an adder which performs a calculation in which the resulting digital value may be beyond the capacity of the adder. This situation is increasingly probable with the development of microcomputer systems with greater memory addressing capability.

SUMMARY OF THE INVENTION

Briefly, and in general terms, the invention is concerned with a data processing system including a circuit for performing effective address computation using an adder circuit, or an adder circuit in conjunction with a microprogram routine, depending upon the value of the effective address. More particularly, the circuit includes a carry detect circuit connected to the adder to determine if the effective address calculation overflows or generates a carry. If a carry is detected, a microinterrupt is generated which permits the effective address calculation to be performed by the microinstruction processor.

DESCRIPTION OF THE PREFERRED EMBODIMENT

Figure 1:
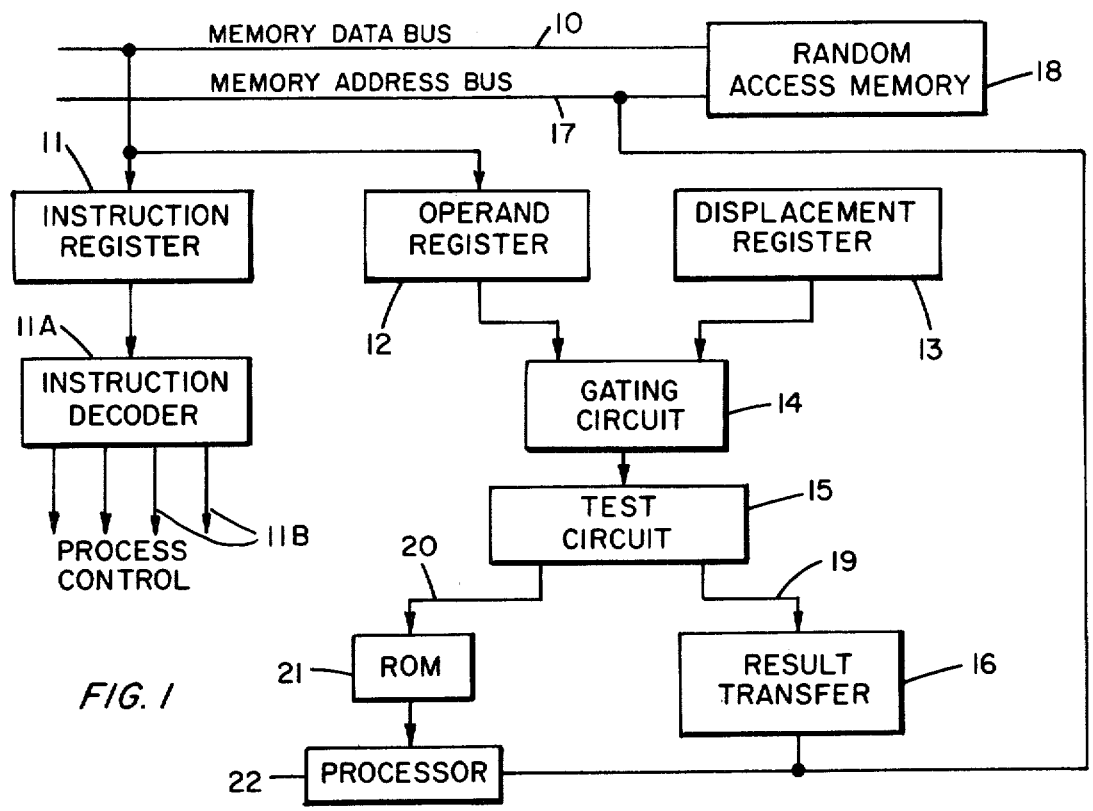
FIG. 1 is a highly simplified block diagram of a first embodiment of the invention in a computer system.

Turning to FIG. 1, there is shown a highly simplified block diagram of a first embodiment of the invention. The invention is basically concerned with an alternative hardware/firmware capability of handling indexed addressing.

Indexed addressing is an addressing technique in which the address of the relevant data is not explicitly specified by the instruction, but must be calculated during the execution of the program. The address specified in the instruction is an intermediate location which will be used in the computation of the actual or "effective" address of the target data.

One basic form of indirect addressing is called indexed addressing because an index register is used to modify the contents of the intermediate register. The embodiment of the present invention discussed herein is described in terms of a single-level index addressing where the modification of the data consists of a simple addition. However, the present invention is not intended to be limited to indexed addressing, but is equally applicable to a more general n-level indirect addressing arrangement.

FIG. 1 shows a portion of the central processor unit of a data processing system. The information concerning the instruction to be executed is supplied over the memory data bus 10. The operator portion of the instruction is transferred to the instruction register 11, while the operand portion is transferred to an operand register 12. Although the instruction register 11 and operand register 12 are shown as two separate registers, this is only by way of example. The number of registers can be selected as a matter of design.

The instruction register 11 is connected to an instruction decoder 11A which functions to decode the instruction and provide a plurality of control signals 11B for distribution to different parts of the system. The timing and use of such control signals is well-known to those skilled in the art, and need not be further described in detail here.

In the indirect addressing mode, the operand register 12 is not used alone to provide the address of the data which is to be processed by the instruction. Data in the operand register 12 must be combined, in some manner, with other data to produce the actual or effective address of the data to be processed by the instruction. In the embodiment of the present invention shown in FIG. 1, such other data is provided in a register designated as displacement register 13.

The data provided in the operand register 12 and the displacement register 13 are combined in the gating circuit 14. As an example, the gating circuit may be an adder which functions to add the contents of the operand register 12 and the displacement register 13. Although the use of an adder as the gating circuit 14 is preferred, other types of arithmetical or logical operations upon the two inputs are within the contemplation of the present invention, and may be suitably chosen for particular indirect addressing applications.

An output of the gating circuit 14 is connected to the test circuit 15. The purpose of the test circuit 15 is to determine whether the effective address calculated in the gating circuit 14 meets some predetermined test criteria or specification for accuracy, validity, or applicability. If the effective address meets such test criteria, the effective address is transferred from the test circuit 15 to a result transfer circuit 16. Circuit 16 functions to transfer the effective address directly to the memory address bus 17 so that data in the random access memory 18 which is to be processed by the current instruction may be fetched accordingly.

In an embodiment of the present invention, the test circuit 15 tests for an overflow from the gating circuit 14, indicating that the effective address is too large to be computed entirely within the gating circuit 14.

In the example of the circuit shown in FIG. 1, the test circuit 15 has two possible outputs 19 and 20. If there is no overflow, and the test criteria are satisfied, output 19 is enabled. Output 19, as described above, transfers the effective address calculated by the gating circuit 14 to the result transfer circuit 16. Conversely, if there is an overflow, or if some other criteria is not satisfied, output 20 is enabled.

The enabling of output 20 is a signal that indicates the gating circuit is not capable of handling the effective address calculation, and that, therefore, the calculation must be performed by another unit. In the embodiment shown in FIG. 1, the effective address calculation is performed by a processor 22 which is activated by a sequence of instructions stored in a ROM 21 to perform the effective address calculation. The output 20 is shown connected to the ROM 21 for diagrammatic purposes. The method of activating the processor 22 and the fetching of appropriate instructions from the ROM 21 can be performed in a variety of ways and would be within the skill of one knowledgeable in the art.

After the effective address has been calculated by the processor 22, it is supplied to the address bus 17 so that the data in the memory 18 which is to be processed by the current instruction may be fetched.

Although the processor 22 shown in FIG. 1 is not explicitly related to the rest of the system, it could be the central processing unit of the system. In such cases, the enabling signal 20 would operate as an interrupt to temporarily halt the program currently being processed, and to execute the effective address calculation routine which is stored in ROM 21.

The test circuit 15, therefore, permits an alternative hardware or firmware capability of handling indirect addressing. The effective address calculation is performed by hardware, i.e., gating circuit 14. If such calculation is insufficient for calculating the correct effective address, the test circuit 15 generates an enabling signal 20 which activates a firmware routine stored in the ROM 21. The firmware routine may use a portion of the effective address already calculated (e.g., the least significant bits), or may begin the entire calculation afresh from the data in the operand register 12 and the displacement register 13.

Figure 2:
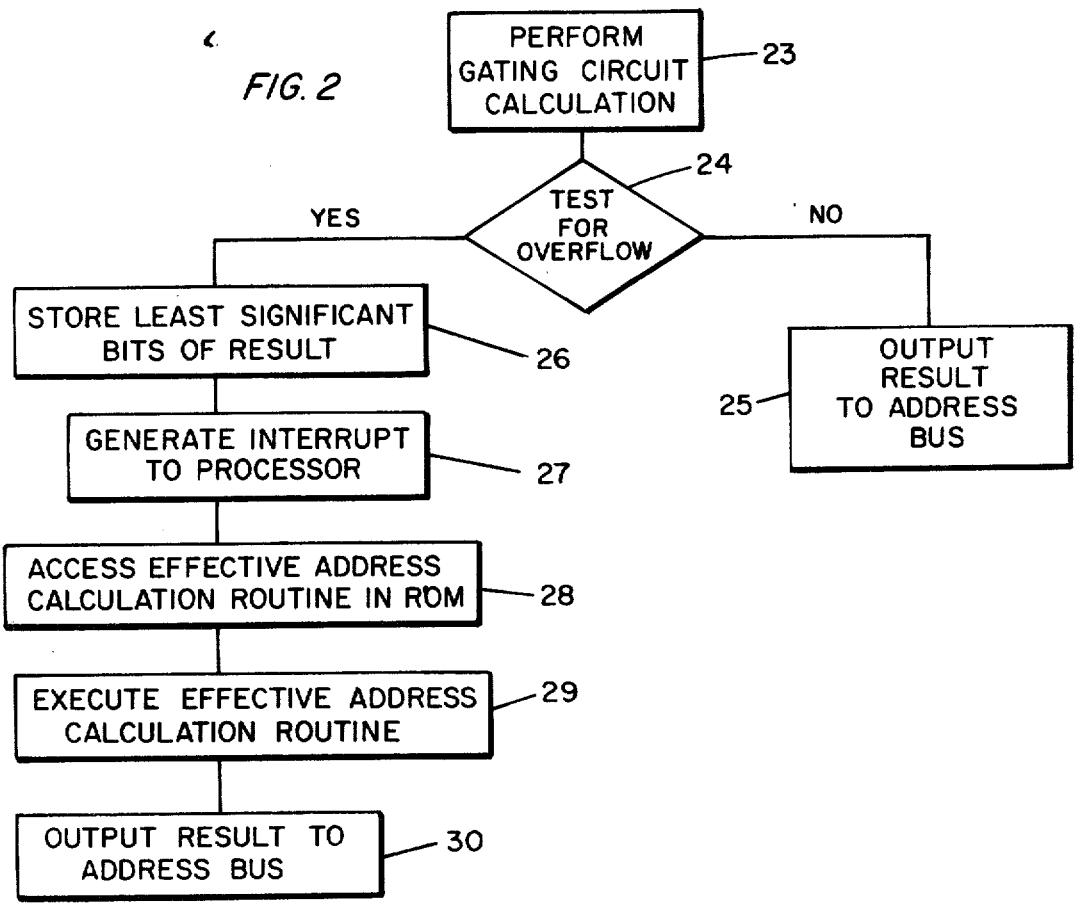
FIG. 2 is a flow chart of the operation of the devices in the circuit in FIG. 1 according to the present invention.

Turning now to FIG. 2, there is shown a flow chart depicting the operation of the circuit arrangement shown in FIG. 1. Block 23 depicts the operation of performing the gating circuit calculation. Using the result of such calculation, there is a "test for overflow" decision made in block 24. If the decision is NO, i.e., there is no overflow, the flow chart leads to block 25, which indicates that the result of the gating circuit calculation is supplied to the address bus.

If the test decision is YES, i.e., there is an overflow, another calculation of the effective address must be performed. In one embodiment of the present invention in which the gating circuit 14 is an adder, the gating circuit 14 is useful for computing the least significant bits of the result. The most significant bits may require calculation by an operating unit capable of handling longer word lengths. Thus, the computation of the least significant bits of the effective address as performed by the adder may be stored, and used together with the later computation of the most significant bits to construct the entire effective address. Block 26, therefore, indicates the operation of storing the result computed by the gating circuit 14 or, more particularly, the least significant bits of the result.

The next step is to carry out the calculation of the most significant bits. In the embodiment of the present invention under consideration, this is done by the processor itself. Since the processor is executing the current instruction which called for the effective address, it is necessary to interrupt the processor using an interrupt signal known in the art, as depicted in block 27. The interrupt is preferably a vectored interrupt. The processor will then automatically store the data in process, typically in a stack, and proceed with the execution of the higher priority program.

The program or routine for calculating the effective address is typically stored in a ROM 21. It is, therefore, necessary to access this calculation routine in the ROM, which is performed by the generation of suitable address and control signals, and depicted by block 28.

The calculation routine is then transferred, instruction-by-instruction, to the processor, and executed, as indicated in block 29. The result of the calculation may be then combined with the least significant bits address portion calculated by the adder, and the final result, viz., the effective address is supplied to the address bus, as represented in block 30.

Figure 3:
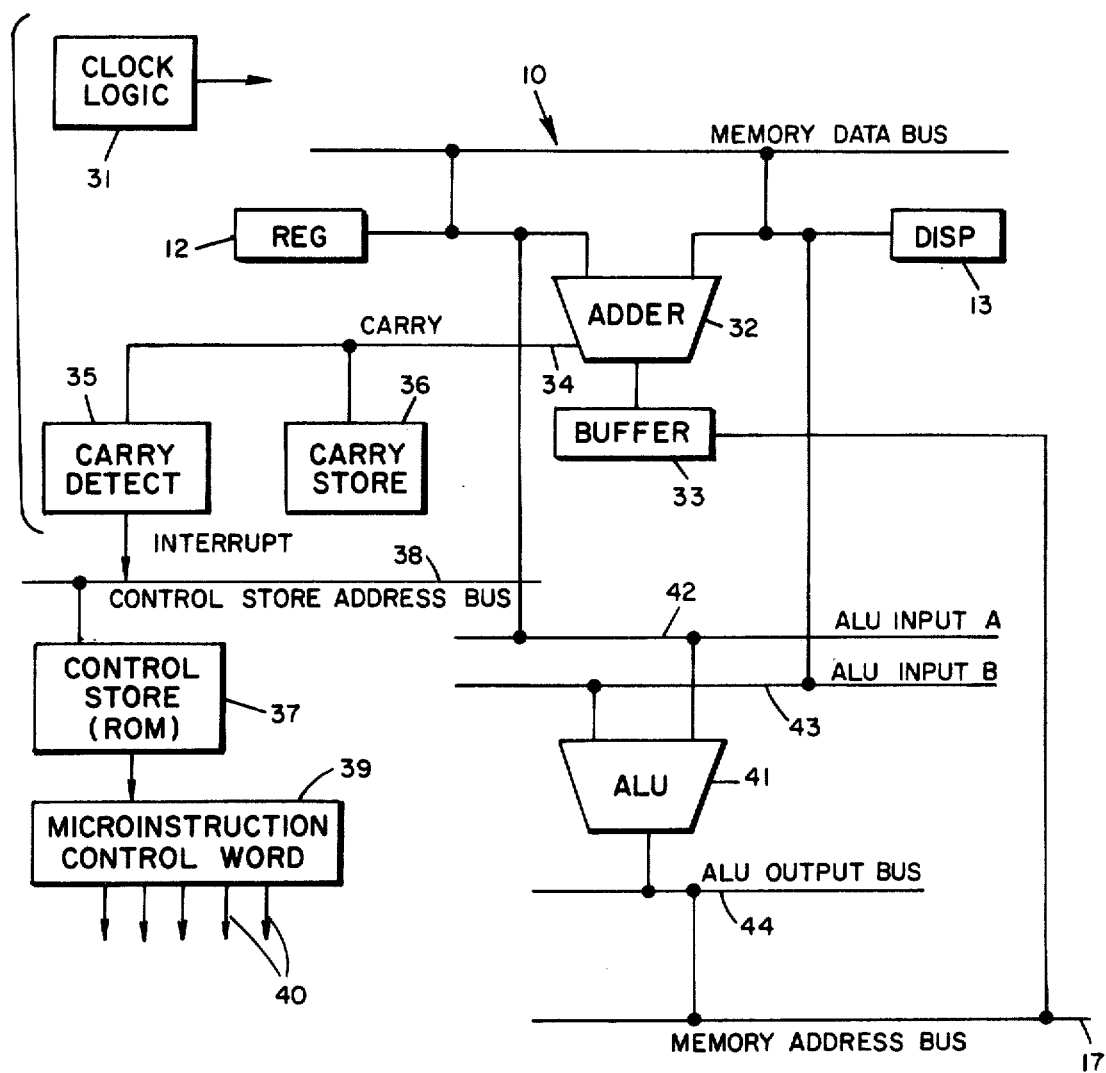
FIG. 3 is a detailed block diagram of one implementation of the present invention in a microprogrammable computer system.

Turning now to FIG. 3, there is shown a detailed block diagram of one implementation of the present invention in a microprogrammable computer system. Like reference numerals in the various Figures refer to like elements, such as the memory data bus 10, memory address bus 17, operand register 12, and displacement register 13. The instruction register 11 and other components of the data processing system of FIG. 1 have been omitted from FIG. 3 for clarity.

A first address component is stored in register 12 and a second address component is stored in displacement register 13. Both registers 12 and 13 are connected to the memory data bus 10 so that data for the address calculation may be derived from the memory.

The clock logic 31 represents circuitry which generates appropriate clocking signals which are supplied for operating various elements of the system. The detailed interconnections are omitted for purposes of clarity.

An adder 32 is provided which has a first input connected to register 12 and a second input connected to register 13. Upon being enabled by an appropriate clock signal from clock logic 31, the adder 32 performs the addition of the data on the first and second inputs and places the result in a buffer 33 which is similar to result transfer 16 of FIG. 1. The adder 32 further includes a carry bit output line 34.

If the addition of the two inputs exceeds the capacity of the adder 32, a carry signal is generated at output line 34 and detected by carry output detect unit 35. The carry bit can be stored in carry store 36 for later use.

The carry detect unit 35 produces an interrupt signal when a carry signal is detected. In a microprogrammable processor, the interrupt signal functions to interrupt an executing microprogram, i.e., a sequence of microinstructions contained in the control store read-only memory (ROM) 37. The executing microinstructions are temporarily suspended, and the pending registers or data in process is stored on a memory stack or other device as is known in the art. In one type of interrupt, a vector address is provided on the control store address bus 38 so that the particular routine for effective address calculation stored in the control store 37 is automatically addressed after the interrupt.

After appropriate clocking, the control store 37 produces a microinstruction control word 39 which is the first instruction in the effective address calculation routine. Various portions 40 or fields of the control word 39 control different elements of the computer, as is known in the field of microprogrammable computers. Among other elements controlled is the arithmetic logic unit (ALU) 41 which performs the addition of the data in registers 12 and 13 which was not performed by the adder 32.

One method of operating the ALU is to permit the most-significant-bit portions of the data stored in registers 12 and 13 to be transferred to ALU input A and ALU input B, respectively, on bus lines 42 and 43. Under such an arrangement, the least-significant-bit portion of the effective address is already calculated from the adder 32, and the ALU 41 functions to calculate the overflow portion, or the most-significant bit portion.

After computing the MSB portion, the ALU 41 may concatenate the LSB and MSB portions to form the final effective address, which is placed on the ALU output bus 44. At an appropriate time the effective address can be transferred to the memory address bus 17 for addressing data as originally intended.

This circuit is, of course, not limited to just one carry bit. One can have multiple carry bits to first shift the displacement left before adding so that bits could shifted into the MS portion and carry portion. Moreover, the second adder (ALU 41) is not absolutely necessary, but the calculation may be performed by the adder 32 in some applications.

Thus, there has been shown and described a preferred embodiment of the invention. The system is depicted in terms of certain types of circuits and the like. Clearly, other types of particular circuits may be used in some instances. For example, only one adder-type circuit need be utilized as discussed relative to FIG. 3. Other specific changes or modifications may be suggested to those skilled in the art. Any such changes or modifications which fall within the purview of this description are intended to be included herein as well. The preferred embodiment shown and described is not intended to be limitative but is intended to be illustrative only. The scope of the invention is limited only by scope of the claims appended hereto.

Having thus described a preferred embodiment of the invention, what is claimed is:

1. A data processing system comprising:
   first address means for storing a first address signal component;
   second address means for storing a second address signal component;
   calculation means having a first input connected to said first address means and a second input connected to said second address means,
   said calculation means operative to produce output signals based upon the value of the data supplied to said first and second inputs;
   test means connected to receive said output signals from said calculation means, said test means operative to generate first and second enabling signals dependent upon the status of said output signals;
   transfer means connected to receive a first output signal from said calculation means and responsive to said first enabling signal from said test means for transferring said first output signal through said transfer means directly; and
   processing means connected to receive a second output signal from said calculation means and responsive to said second enabling signal for further processing the data on said first and said second inputs of said calculation means, and producing a further output signal as the result of the further processing.

2. The system recited in claim 1 wherein,
   said calculation means comprises an adder and said output signals includes a carry bit output produced by said adder.

3. The system recited in claim 2 wherein,
   said test means determines whether said carry bit output signal is a logical 1 or a logical 0 and produces said first enabling signal if said carry bit output signal is a logical 0 and said second enabling signal if said carry bit output signal is a logical 1.

4. The system recited in claim 1 including,
   memory means connected to supply signals to said first and second address means.

5. The system recited in claim 4 wherein,
   said memory means is a random access memory.

6. The system recited in claim 1 wherein,
   said processing means is a microprogrammable processor.

7. The system recited in claim 6 comprising,
   control store means containing instructions for performing an effective address calculation by said microprogrammable processor, said control store means responsive to said second enabling signal for transferring said instructions to said microprogrammable processor execution.

8. The system recited in claim 7 wherein, said control store means is a read-only memory containing microinstructions.

9. The system recited in claim 7 wherein said microprogrammable processor is responsive to said instructions for computing the most-significant-bit (MSB) portion of the effective address as derived from said first and second address components, and for concatenating the computed most-significant-bit portion of the effective address with the least-significant-bit (LSB) portion of the effective address as computed by said calculation means thereby to produce the effective address.

10. The system recited in claim 4 wherein, said calculation means functions to compute the effective address of data to be addressed in said memory means.

11. The system recited in claim 4 including, memory address bus means connecting the outputs of said transfer means and said processing means to said memory means, memory data bus means connecting said memory means to said first address means.

12. The system recited in claim 11 including, means connecting said transfer means and said processing means to said memory address bus.

13. The system recited in claim 1 including, instruction means connected to said processing means for supplying control signals thereto.

14. The system recited in claim 13 wherein, said instruction means includes instruction register means for receiving and storing instructions, and instruction decoder means for decoding said instructions and applying control signals to said processing means.

15. A data processing system comprising:

first address means for storing a first address signal component;

second address means for storing a second address signal component;

calculation means having a first input connected to said first address means and a second input connected to said second address means, said calculation means operative to produce first and second output signals representative of the value of the combined first and second address signal components supplied to said first and second inputs;

transfer means connected to receive said second output signal from said calculation means and responsive for selectively transferring said second output signal therethrough; and processing means connected to receive said first output signal from said calculation means and responsive for selectively processing the signals on said first and said second inputs of said calculation means and producing a further output signal as the result of the processing.

* * * * *